Nov. 13, 1962   W. C. WEHNER   3,063,436
ENGINE STARTER

Filed Nov. 19, 1958   3 Sheets-Sheet 1

INVENTOR.
WILLIAM C. WEHNER
BY
ATTORNEY

INVENTOR.
WILLIAM C. WEHNER

United States Patent Office 3,063,436
Patented Nov. 13, 1962

3,063,436
ENGINE STARTER
William C. Wehner, Detroit, Mich., assignor to Moto-Mower, Inc., Oak Park, Mich., a corporation of Delaware
Filed Nov. 19, 1958, Ser. No. 774,976
9 Claims. (Cl. 123—179)

This invention pertains to starting devices for internal combustion engines, particularly engines of small horsepower output such as commonly used to drive lawn mowers, and like vehicles.

Small engines used on power lawn mowers are of both the two cycle and four cycle types and usually are started by a cord or recoil starter. The effort required is not great, but some persons find such starters difficult and objectionable to use. Electric starters, kick starters, recoil starters with remote operation, and other devices, have been tried with indifferent success.

I propose to provide in a power lawnmower or like implement, an easily operated, semi-automatic engine starting device which is economical to construct, is operated by the operator pushing the mower in the normal direction of travel and which is rugged and durable. Such is the principal object of my invention.

Another object is to provide a lawn mower engine starter which comprises a spring adapted to be wound by pushing the mower a short distance whereupon the stored energy in the spring may be applied to the engine flywheel to rotate the flywheel at sufficient speed to start the engine.

For a description of a preferred embodiment of my invention reference is made to the following specification and to the accompanying drawings in which reference characters have been used to designate like parts referred to in the specification.

Figure 1:
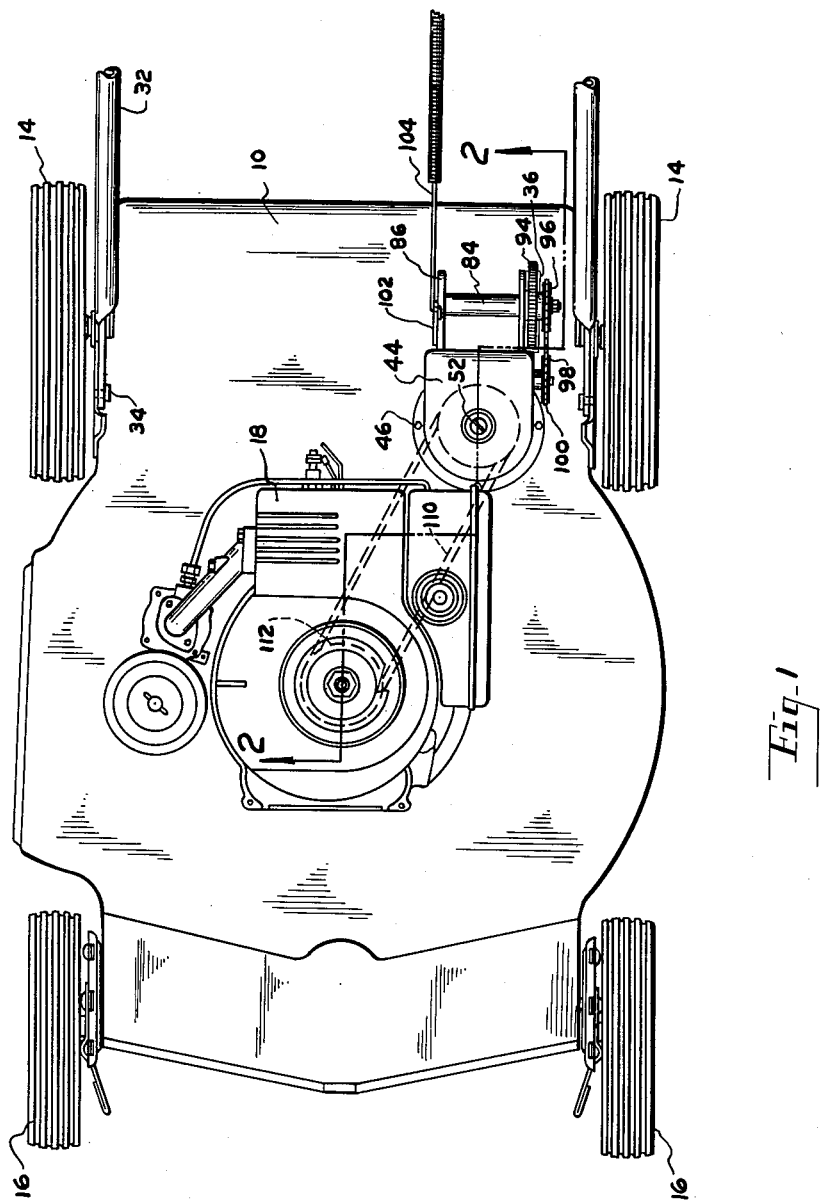
FIG. 1 is a plan view of a rotary lawnmower embodying my invention.

Referring to the figures, it will be seen that the particular lawn mower chosen to illustrate an example of my invention comprises a deck 10 having a skirt 12 on which are mounted rear wheels 14 and front wheels 16.

An engine 18 is mounted centrally of the deck by suitable fastenings 20. The engine may be either a two cycle or four cycle type provided with the usual flywheel (not shown) and has a vertically disposed crankshaft provided with an outward extension 22 on which is secured a hub 24 which, in turn, carries a cutting blade 26.

The front wheels 16 may be mounted on the skirt 12 in any suitable manner. The rear wheels 14 are carried by a live axle 28 which is journaled in the deck skirt 12 by bearings 30. A handle 32, provided with the usual handle bar or grip (not shown) is provided for pushing and guiding the mower.

The axle 28 carries a spur gear 34 which is fixed thereto by a pin or other means. The deck 10 has an opening 36 in the top surface thereof above the gear 34 for a purpose about to be explained.

Forwardly of the opening 36, the deck 10 carries a boss 38 in which is journaled an upright shaft 40 by means of a bushing 42. A bell housing 44 is secured to the deck 10 by bolts 46 in surrounding relation to the shaft 40. The housing has a boss 48 in its top position in which is journaled the reduced upper end of the shaft 40 by means of an anti-friction, ball bearing 50. A flathead screw 52 retains the parts in assembly.

The shaft 40 is formed with an enlarged diameter portion 54 which provides a shoulder for positioning the bushing 42. A flat coiled spring 56 is disposed in the housing 44 in surrounding relation to the shaft 40. The inner end of the spring 56 is fastened to the portion 54 of shaft 40 by a flat head set screw 58, and the outer end is provided with a tab 60 which engages a slot 62 in the sidewall of the housing 44.

The shaft 40 is formed with a portion 57 of still larger diameter above which is integrally formed a helical gear 66.

Journaled in the housing 44 in right angular relation to shaft 40 is a shaft 68. The latter is of stepped construction and is mounted in the housing by ball bearing 70 and bushing 72. (See FIG. 3.) A second helical gear 74 is keyed to the shaft 68, a spacer 76 and snap ring 78 being provided for locating the gear in such position that it meshes with the helical gear 66.

Figure 3:
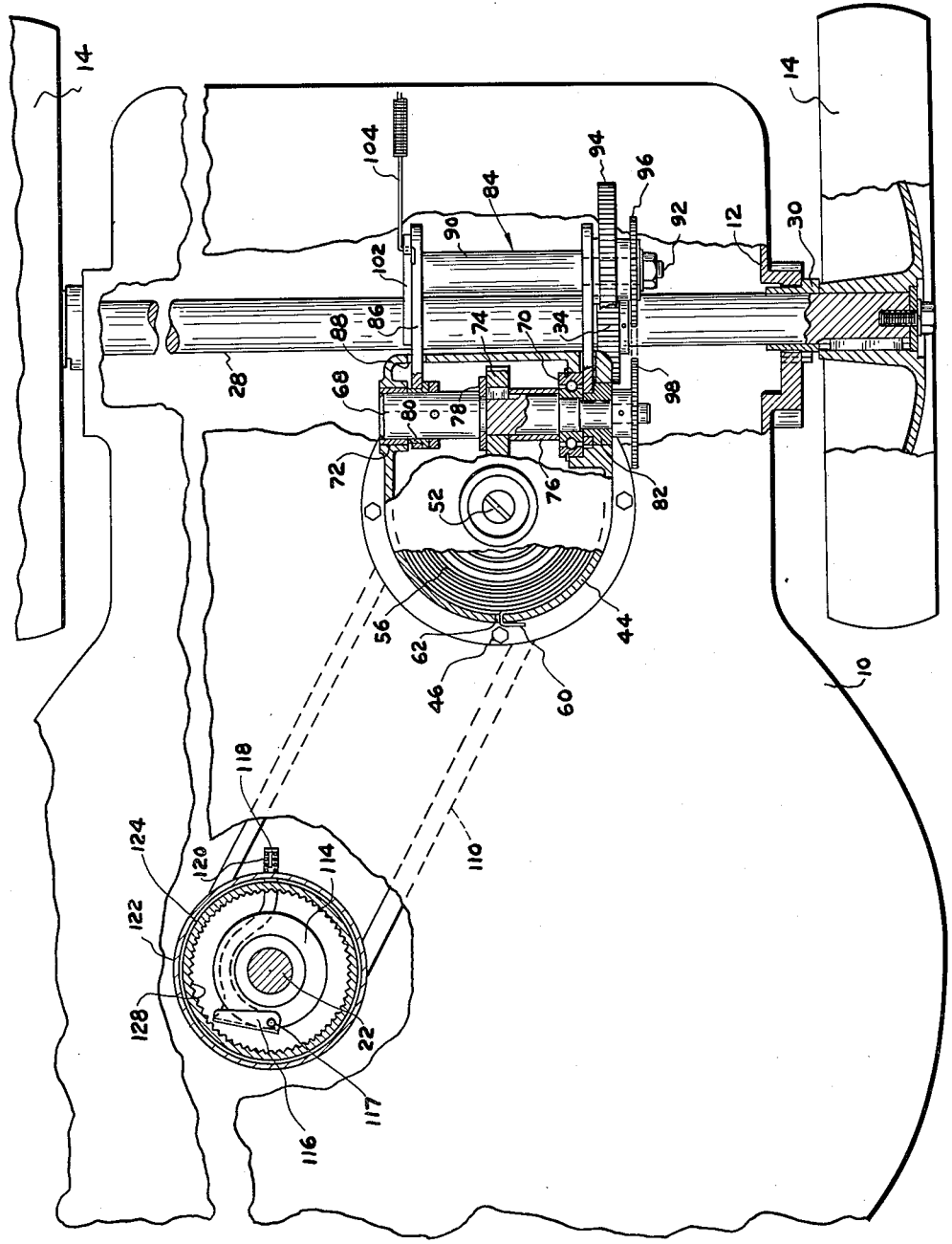
FIG. 3 is a plan view of the mechanism shown in FIG. 2 with parts broken away to show sectional details.

Hinged on the shaft 68 by means of stepped bushings 80, 82, is a carrier 84. The carrier 84 comprises oppositely disposed arms 86, which are swingable in the housing slots 88, and a cylindrical portion 90 on which is fixed an outboard shaft 92 (FIG. 3). The shaft 92 carries a spur gear 94 adapted for meshing engagement with the gear 34 and an integral sprocket 96 which is drivingly connected to a second sprocket 98 fixed on the shaft 68 by a chain 100 (FIGS. 1 and 3).

The carrier 84 carries a fixed arm 102 which is engaged at its outer end with a Bowden wire 104. The latter is preferably connected with an operating lever mounted on the mower handle-bar (not shown), such that by pulling the wire 104 to swing the arm 102 clockwise, the carrier 84 is swung about its swing axis and the gear 94 is meshed with the gear 34.

Figure 2:
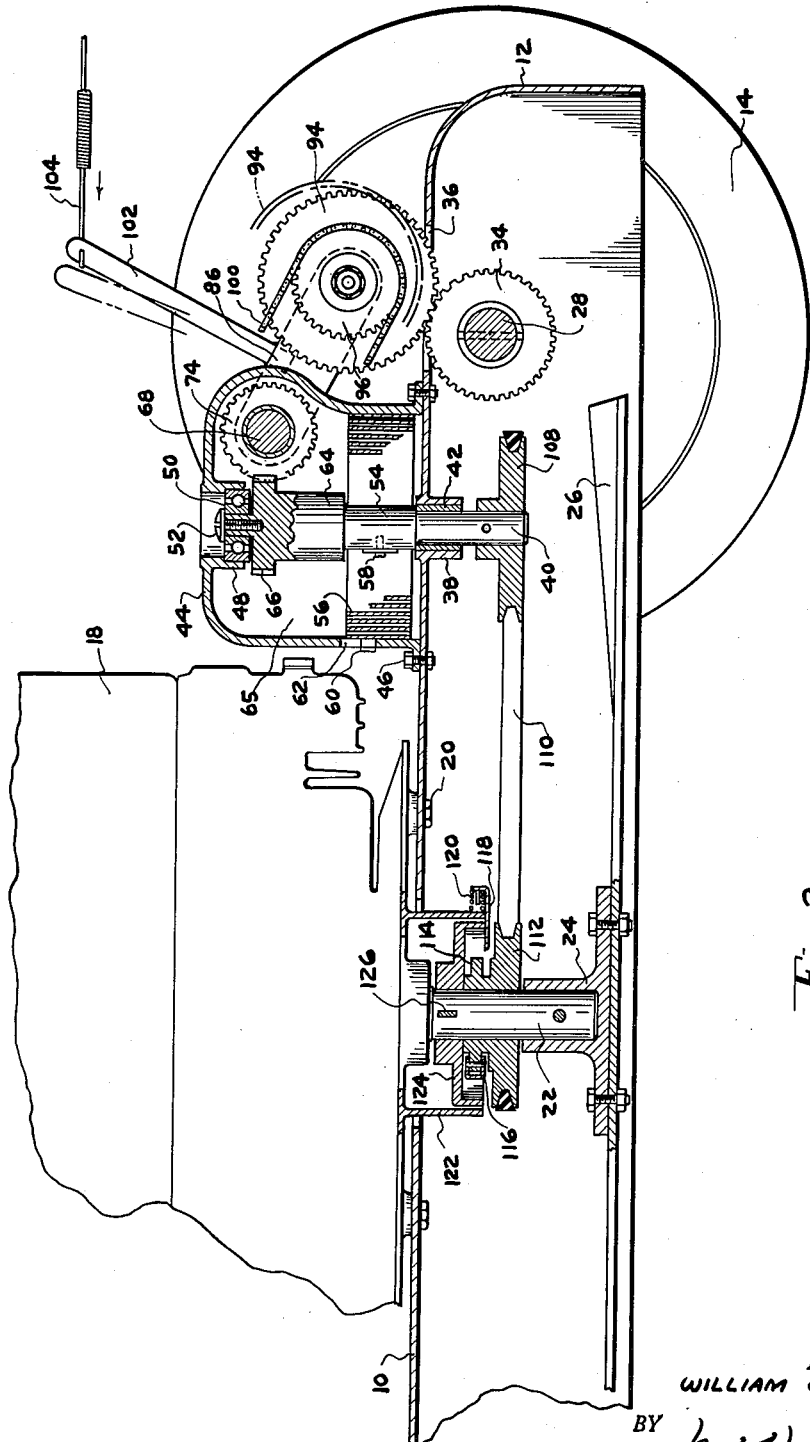
FIG. 2 is a part section, on an enlarged scale, taken on line 2—2 of FIG. 1.

A pulley 108 (FIG. 2) fixed to the lower end of shaft 40 is drivingly connected by a belt 110 to a second pulley 112 which is freely mounted on the crankshaft extension 22. The pulley 112 is provided with an integral spaced annular drive ring 114 on which is pivotally mounted a drive ratchet dog 116. (See FIGS. 2 and 3.)

The ratchet has a main driving dog portion 116 and an integral arm 118 which extends under the pulley drive ring 114 and outwardly of the downwardly extended annular portion 122 of the engine crankcase. The end of arm 118 is bent upwardly and a coil spring 120 is fixed on the arm such that it bears on the outer surface of the annular extension 122 and thus frictionally retards rotation of the pulley 112 and associated parts.

A driven cup member 124, keyed to shaft 22 by key 126, has a downwardly extending portion provided with serrations 128 which surrounds the drive ring 114 and ratchet 116 in circumferentially spaced relationship. It will be seen that clockwise rotation of pulley 112 will result in the ratchet dog 116 being swung outwardly about its pivot 117 because of the retarding action of the spring 120. This will cause the dog to engage the serrated teeth 128 and the driving cup 124 and shaft 22 will be rotated. On the other hand, relatively faster rotation of the crank shaft 22 and cup 124 clockwise (which is the normal direction of engine rotation) will tend to cam the ratchet dog 116 radially inwardly and out of engagement with the serrations 128, thereby permitting the shaft 22 to overrun the pulley 112 and its associated parts.

Operation of the device is as follows:

Let it be assumed that the engine 18 is at rest and it is desired to start it. The operator pulls the cable 104 to engage the gears 94 and 34 and manipulates the engine choke control if necessary. The carrier 84 will stay in its down or gear-engaging position by gravity, but if desired some kind of over-center lever may be provided tion or scope of the invention.

Once the gears 34 and 94 are engaged, forward movement of the mower by pushing on the handle 32 (or by pulling the mower forwardly) will result in winding of the flat coil spring 56. The gear 34 rotates counterclockwise with the axle 28 and wheels 14 which turns gear 94, sprocket 96, chain 100, sprocket 98, shaft 68, helical gear 74 and helical gear 66, which thus winds the spring 56 through counterclockwise rotation of shaft 54.

The helical gears 66—74, are of the type designed to mesh and transmit torque between shafts disposed at right angles, and by tracing through the rotation of the various elements it will be seen that when the mower is pushed or pulled forwardly, the gear train between axle 28 and shaft 40 will rotate the latter counterclockwise and will wind spring 56.

When the spring 56 is wound tight or substantially so, this fact will be telegraphed to the operator because the resistance to turning of the wheels 14 will become substantial. Experience has shown that about a dozen paces is all that is required to wind the spring completely. The spring 56 will remain tight because of the frictional resistance of the connected gear train and axle 28. The Bowden cable 104 is then pulled to swing the carrier 84 upwardly and disengage gear 94 from gear 34. This instantly relieves the retarding force on spring 56 and the latter will unwind with extreme rapidity.

The unwinding of the spring will rotate shaft 40, pulleys 108 and 112, and drive ring 114, rapidly in clockwise direction. As explained above, upon clockwise rotation of ring 114, the retarding action of the spring 120 will cause the dog 116 to swing radially outwardly and engage the teeth 128 whereupon driven cup 124 will be rapidly accelerated. When the engine "catches" and starts operating under its own power, the cup 124 will overrun the ring 114 and the teeth 128 will kick the dog 116 radially inwardly and out of engagement.

It will be noted that the gears 66, 74, sprockets 98, 96, gear 94 and shaft 92, will be also rotated by the spring 56 upon disengagement of the gear 94 from gear 34. This has no adverse effect on engine starting, experience having demonstrated that it is possible to provide plenty of torque in the spring 56 without difficulty.

The normal operating speed range of small engines used on lawn mowers is approximately 1800–3600 r.p.m. It requires from three to four revolutions of the crankshaft of a four-cycle engine at a speed of approximately 400 r.p.m. to start the engine. A two-cycle engine requires about two and one-half revolutions at about the same speed to start. The spring 56 may, of course, be selected of such size and tension to provide such storage of energy as may reasonably be required. I have found that a spring which will provide from four to five crankshaft revolutions at about 400 r.p.m. is ample, and such a spring is comparatively compact, is of low price and is well suited to the use described.

Small engines of modern design are easily started even in cold weather if in reasonably good condition, and my improved and novel starting device provides an easy method of starting and eliminates the tiresome hand pulling commonly required. If the engine should not start in response to the first try, the gears 36 and 34 may be re-engaged and the operation repeated.

The starting device described herein is particularly attractive to lawn mower operators because it is actuated by normal and natural operation of the mower itself. In the normal use of the device, the operator simply pulls the Bowden wire 104 to engage the starter, walks ahead pushing the mower until the resistance to forward movement indicates that the spring is wound, then pushes the Bowden wire to disengage the starter whereupon the engine starts automatically and the mower is ready for use.

While I have shown a specific embodiment of the invention as applied to a particular device, it will be understood that this has been done for illustrative purposes and is not to be considered as limiting the application or scope of the invention.

I claim:

1. In combination with a push-type lawnmower having a supporting axle, an engine having a crankshaft mounted on said mower, a spiral coil spring carried by said mower, manually engageable drive means for interconnecting said axle and said spring whereby said spring may be wound by pushing said mower and means for connecting said spring to the crankshaft of said engine thereby to cause the stored energy of the spring to accelerate said crankshaft above the critical starting speed of the engine.

2. The combination set forth in claim 1 wherein the spring is wound by rotation of the axle in forward direction of travel.

3. In a push-type lawnmower having a wheeled axle, in combination, an engine carried by the mower, an engine shaft carried by the engine, a spiral spring carried by the mower, releasable drive means interconnecting said axle and said spring whereby said spring may be wound by rotation of said axle through pushing of the mower in normal direction of travel, one-way drive means interconnecting said spring and said engine shaft, means for holding said spring in tension after it has been wound, and selectively operable means for releasing said holding means thereby to cause the stored energy of said spring to rotate said engine shaft.

4. In a lawn mower, in combination, a frame, an engine on said frame, a wheeled axle carried by said frame, starting means for said engine comprising a spring and means for interconnecting said spring and the engine crankshaft whereby the stored energy of said spring may be applied to rotate said crankshaft above the critical starting speed of said engine, means for winding said spring by rotation of the said axle comprising, a swingable carrier, a shaft in juxtaposed relationship to said carrier, a driving connection between said shaft and said spring whereby the spring is tensioned by rotation of said shaft, a gear on said shaft, a gear on said carrier in mesh with said shaft gear, and releasable drive transmission means between said carrier gear and said axle.

5. In a lawn mower, in combination, a frame, an engine on said frame, a wheeled axle carried by said frame, starting means for said engine comprising a spring and means for interconnecting said spring and the engine crankshaft whereby the stored energy of said spring may be applied to rotate said crankshaft above the critical starting speed of said engine, means for winding said spring by rotation of the said axle comprising, a swingable carrier, a shaft in juxtaposed relationship to said carrier, a driving connection between said shaft and said spring whereby the spring is tensioned by rotation of said shaft, a gear on said shaft, a driven gear on said carrier disposed in mesh with said shaft gear, a driving gear on said carrier, drive transmission means between said carrier gears, a gear on said axle, and means for swinging said carrier about its swing axis thereby to engage and disengage said carrier driving gear and said axle gear.

6. In combination with a lawnmower adapted to be operated by a person walking behind and having an engine mounted thereon, the engine having a crankshaft, wheels supporting the mower for travel over the ground, a spring carried by the mower, disengageable means for coupling the spring with one of said wheels operable when engaged to cause said spring to be tensioned by pushing said mower in its normal direction of travel, and means for applying the stored energy of said spring to the crankshaft of said engine for starting the same.

7. Means for starting an internal combustion engine which is mounted upon the wheeled chassis of a hand-controlled walking-attendant type engine powered implement, comprising: a ground-engaging wheel on the chassis of the implement to turn as the implement is manually propelled along the ground; a wind-up spring motor; means operatively connecting said spring motor with the engine and through which release of energy stored in the spring motor acts to start the engine, said spring motor being normally unwound; manually controllable means to connect the spring of the motor with said ground engaging wheel and through which rotation of said wheel as the implement is manually propelled along the ground acts to wind up the spring of the spring motor; and manually controlled means to effect release of the energy stored in the spring motor.

8. Means for starting an internal combustion engine which is mounted upon a wheeled chassis intended to be manually propelled along the ground, and in which the engine drives an instrumentality mounted on the chassis but not concerned with propulsion of the chassis, the engine having a crankshaft, said means comprising: a spring; means operatively connecting the spring with the engine crankshaft and through which the spring acts to impart engine-starting rotation to the crankshaft when energy stored in the spring is released; a ground engaging wheel on the chassis to turn as the chassis is manually propelled along the ground; means including manually engageable and disengageable drive transmitting means to operatively connect the spring with the ground engaging wheel, and through which rotation of the ground engaging wheel as the chassis is manually propelled along the ground, acts to energize the spring when said drive transmitting means is engaged; and manually operable means to engage and disengage said drive transmitting means.

9. The engine starting means of claim 8, wherein at least one of said means operatively connecting the spring with the engine and with the ground engaging wheel includes a flexible tension member so as to provide maximum flexibility in the relative locations of the ground engaging wheel and the engine.

References Cited in the file of this patent

UNITED STATES PATENTS

| | | |
|---|---|---|
| 1,031,134 | Stauter | July 2, 1912 |
| 1,130,059 | Brewer | Mar. 2, 1915 |
| 1,749,189 | Mack | Mar. 4, 1930 |

FOREIGN PATENTS

| | | |
|---|---|---|
| 26,396 | Great Britain | Nov. 4, 1899 |